US008761146B2

(12) United States Patent
Rinne (10) Patent No.: US 8,761,146 B2
(45) Date of Patent: Jun. 24, 2014

(54) COMMUNICATION ON A PLURALITY OF CARRIERS (75) Inventor: Mikko J. Rinne, Espoo (FI)

(73) Assignee: Nokia Corporation, Espoo (FI)

( * ) Notice: Subject to any disclaimer, the term of this patent is extended or adjusted under 35 U.S.C. 154(b) by 1217 days.

(21) Appl. No.: 11/613,477

(22) Filed: Dec. 20, 2006

(65) Prior Publication Data
US 2008/0080471 A1 Apr. 3, 2008

(30) Foreign Application Priority Data

Sep. 29, 2006 (GB) .................................. 0619266.0

(51) Int. Cl.
H04J 1/00 (2006.01)
H04B 15/00 (2006.01)

(52) U.S. Cl.
USPC ........................................... 370/343; 455/503

(58) Field of Classification Search
USPC .......... 455/503, 501, 502, 504; 370/328, 338, 370/343
See application file for complete search history.

(56) References Cited

U.S. PATENT DOCUMENTS

| 6,981,032 | B2* | 12/2005 | Boivie et al. ................... 709/219 |
| 2003/0060196 | A1* | 3/2003 | Levinberg ..................... 455/428 |
| 2004/0085891 | A1* | 5/2004 | Henriksson ................... 370/203 |
| 2004/0116139 | A1* | 6/2004 | Yi et al. ........................ 455/503 |
| 2005/0058089 | A1 | 3/2005 | Vijayan et al. |
| 2005/0096033 | A1* | 5/2005 | Miyawaki et al. ......... 455/422.1 |
| 2006/0030271 | A1* | 2/2006 | Ishihara ..................... 455/67.11 |
| 2006/0067206 | A1* | 3/2006 | Mantravadi et al. .......... 370/208 |
| 2006/0098567 | A1* | 5/2006 | Willenegger et al. ......... 370/206 |
| 2006/0176966 | A1* | 8/2006 | Stewart et al. ................ 375/260 |
| 2006/0209824 | A1* | 9/2006 | Ross et al. .................... 370/390 |
| 2007/0263626 | A1* | 11/2007 | Warden ......................... 370/390 |
| 2007/0287462 | A1* | 12/2007 | Gorokhov et al. ............ 455/439 |
| 2008/0077701 | A1* | 3/2008 | Kongalath et al. ............ 709/232 |

FOREIGN PATENT DOCUMENTS

| WO | WO2006036759 | 4/2006 |
| WO | WO2006047571 | 5/2006 |
| WO | WO2006052208 | 5/2006 |

OTHER PUBLICATIONS

Nokia: "MBMS dedicated carrier and MBMS Control Plane design" 3GPP TSG-RAN WG2 Ad-Hoc on LTE (R2-061844), [Online] Jun. 27, 2006-Jun. 30, 2006 XP002467019 Cannes, France, Retrieved from the Internet: URL:http://www.3gpp.org/ftp/tsg_ran/WG2_RL2/TSGR2_AHs/2006_06_LTE/Docs/> [retrieved on Jan. 28, 2008].

International Search Report on PCT/IB2007/002338—Date of Completion of Search: Jan. 31, 2008.

T. Nilsson, et al., "Early Multicast Collision Detection in CSMA/CA Networks", Department of Computing Science, Umea University, SE-901 87 Umea, Sweden, 2002 IEEE, pp. 294-298.

Communication dated Jul. 5, 2010 for European App. No. 07 789 631.4-2416, 6 pages.

* cited by examiner

Primary Examiner — Christopher M Brandt
(74) Attorney, Agent, or Firm — Locke Lord LLP (57) ABSTRACT A communication device comprising a receiver for receiving first information entities associated with a first communication and second information entities associated with a second communication. The communication device is configured to generate information regarding the positions of information entities associated with the first communication relative to information entities associated with the second communication. A transmitter for sending said information to an external entity is also provided. A controller for using the information and method of controlling transmissions of information entities to and/or from the communication are also disclosed.

27 Claims, 3 Drawing Sheets

COMMUNICATION ON A PLURALITY OF CARRIERS

FIELD OF THE INVENTION

The invention relates to communications on a plurality of carriers, and more particularly to communication of frames on a plurality of carriers to a communication device.

BACKGROUND OF THE INVENTION

A communication device is a device provided with an appropriate signal receiving and transmitting arrangement for enabling communication with other parties. Typically a communication device is used for communication via a communication system for enabling the users thereof to receive and transmit communication such as speech and data. A communication system can be seen as a facility that enables communication sessions between two or more entities such as the communication devices and/or other nodes associated with the communication system. Subscribers or users to a communication system may be offered and provided numerous services via their communication devices. Non-limiting examples of these services include two-way or multi-way calls, data communication or multimedia services or simply an access to a data communications network system, such as the Internet. User may also be provided broadcast or multicast content such as television programs. Examples of communication systems include fixed line communication systems, such as a public switched telephone network (PSTN), local area networks (LAN) and wireless communication systems, such as a public land mobile network (PLMN), satellite based systems and wireless local area networks (WLAN).

Communication with a communication device may be provided as point-to-point communications or point-to-multipoint communications. Point-to-point communications are also known as unicasting. Point-to-multipoint communications can be provided by means of multicasting or broadcasting. The distinction between these two forms or communication is rather vague but a view is that multicasting requires the user to join a group whereas broadcasting is provided without any interaction between the end-user and an entity responsible for sending the content. Regardless the type of the point-to-multipoint services, a common feature of them is that a shared stream of data can be simultaneously transmitted to a multiple of communication devices. That is, a number of recipients can receive the same data transfer flow.

A communication system may be provided with a point-to-multipoint service entity such as a multimedia broadcast/multicast service (MBMS) server, which is able to broadcast or multicast information to multiple participants over a geographical area. The server can provide an entry point for multicast/broadcast transmissions of a content provider providing broadcast or multicast data to communication devices situated in a geographical area served by the server.

When providing a point-to-multipoint service with multiple transmitting devices the range of the radio transmission, the quality of reception and consequently the capacity of the communication system can be greatly improved by synchronizing the transmissions from the plurality of transmitting devices. If all transmitting devices belonging to the same broadcast/multicast service area transmit the same signal at the same time, the receiving communication device can constructively use all of these transmissions and consequently sees only one very powerful transmitting device. In the art such a network is known as a single frequency network (SFN). This technique may be used in applications such as Digital Video Broadcasting for Handheld (DVB-H).

Even though it is possible to synchronise the transmitting devices for point-to-multipoint communications, it can be very costly to synchronize all transmitting devices in the area for point-to-point communications. Therefore current communication systems for point-to-point communications typically operate asynchronously. If point-to-multipoint transmission that is synchronized over a large area is combined with asynchronous point-to-point transmission, the result is a situation where the relative timing of the point-to-multipoint and point-to-point communications is variable and cannot be easily coordinated by the network or networks carrying the traffic.

End users may expect to be able to receive point-to-point i.e. unicast services such as voice calls simultaneously with multicast/broadcast service reception. When multicast/broadcast services are provided on a separate carrier frequency from the unicast service, the communication device would therefore have to be either provided with multiple parallel receivers to be able to receive from multicast/broadcast and unicast carrier frequencies at the same time, or the services would have to be provided in a time-multiplexed manner such that the multicast/broadcast and unicast transmissions for a single mobile device would not overlap in time. This also requires that the mobile device can switch between the two carriers.

The random overlapping of unicast and multicast/broadcast services on separate frequencies may cause some problems due to the above reasons. Sharing of receiver hardware in a wireless communication device may not be possible. Instead, two separate receivers may be needed. This impacts the cost, power consumption and size of the wireless communication devices. Also, the transmitter of the wireless communication device may interfere with the receivers thereof, and filtering may be needed to separate these. To enable an efficient filtering solution with reasonable cost and size in a wireless communication device, enough guard band between the uplink and downlink communications needs to be reserved.

The guard band may become a problem with spectrum allocations, where potentially available multicast/broadcast spectrum is close to a point-to-point transmitter bandwidth of an end-user communications device. The above mentioned DVB-H is an example of a communications system, where the available frequency band has to be within certain limits, more particularly to be below 750 MHz, because otherwise it would get too close to the transmitter bandwidth 900 MHz of the GSM (Global System for Mobile communications). DVB-H and GSM are uncoordinated and therefore a time-multiplexed solution has not been considered as feasible. Because of this a potential DVB-H band between 750-862 MHz cannot be used. Considering the ever increasing demand for bandwidth capacity, this can be considered as inefficient use of resources.

Carrying the unicast and multicast/broadcast communications on a single carrier frequency in a time-multiplexed transmission solves the problem of parallel receiver hardware in a wireless communication device. However, this approach limits the bandwidth available for unicast and multicast/broadcast services because they have to share the same frequency band. If unicast and multicast/broadcast frames are sent on the same carrier, and the network is operated as a single frequency network, all devices that provide shared unicast and multicast-broadcast data have to be synchronized. This has a negative impact on the cost of the network deployment. If one wants to expand the multicast/broadcast service offering, multiple parallel mixed carriers may be required, this further complicating the overall control of the system, in particular because the unicast services may need to be provided on the same carrier. Also, for example if an end user has an ongoing speech call and the user changes the TV channel to a channel which is provided on another mixed carrier, the speech call has to be handed over together with the multicast/broadcast session to be able to continue both services on the same mixed carrier.

On the other hand, if the unicast and multicast/broadcast carriers are separated, timing of the carriers becomes an issue. This is so because in a multicast/broadcast single frequency network timing is the same in the entire network. TV-channels within the multicast/broadcast carrier are time-multiplexed and each channel is sent only once in its respective frame position. The timing of the unicast carrier is, however, different in each base station and also for each user. The multicast/broadcast transmission cannot purposefully create any gaps for the unicast carrier, because each user would need them at a different time. The unicasting base station entity does not have any knowledge of what a wireless communication device may be receiving on the multicast/broadcast carrier. Neither does the unicasting base station know how that transmission is timed. The unicasting base station serving the wireless communication device may not even be involved in the multicast/broadcast transmission at all. This may be so because all base station sites of a single frequency network are not necessarily needed to create continuous multicast/broadcast coverage, due to the improved range of the single frequency network.

It is noted that these issues are not limited to any particular communication environment, but may occur in any appropriate communication system.

SUMMARY OF THE INVENTION

Embodiments of the invention aim to address one or several of the above issues.

In accordance with an embodiment there is provided a communication device. The communication device comprises a receiver for receiving first information entities associated with a first communication and second information entities associated with a second communication and a processor that is configured to generate information regarding the positions of information entities associated with the first communication relative to information entities associated with the second communication. A transmitter for sending said information to an external entity is also provided.

According to another embodiment there is provided a controller for controlling communication of information entities with communication devices. The controller comprises an interface for receiving information from a communication device regarding relative positions of first information entities associated with a first communication and second information entities associated with a second communication. The controller also comprises a processor configured to control communication of first information entities based on the received information such that the first information entities are positioned in the first communication such that they do not coincide with the second information entities of the second communication.

According to another embodiment there is provided a method for communication of information entities. The method comprises receiving at a communication device a first communication and a second communication, generating at the communication device information regarding positions of information entities associated with the first communication relative to information entities associated with the second communication, and sending said information from the communication device to a controller.

In accordance with more specific embodiments, the receiver may be configured to receive the first information entities and the second information entities on different carrier frequencies. The communication device may be configured to perform a cell search procedure to discover the carrier frequency of at least one of the first information entities and the second information entities. The receiver may be configured to receive the first communication is from an asynchronous system and the second communicated from a synchronous system. The receiver may be configured to receive a point-to-point carrier in accordance with a cellular standard and a point-to-multipoint carrier in accordance with another standard.

The processor of the communication device may also be configured to determine which ones of the information entities associated with the second communication overlap with the information entities associated with the first communication.

The first information entities may associate with a unicast service. The second information entities may associate with a broadcast service or a multicast service. The processor of the communication device may be is configured to determine unicast transmission time intervals that are blocked by multicast/broadcast transmission.

The processor of the communication device may be configured to generate a report containing information regarding at least one of an identification of a first blocked information entity, a number of consecutive blocked information entities, and a repetition period of blocked information entities. The processor may be configured to generate a report in response to a detection that the positioning of the information entities associated with the second communication has changed relative to the positions of the information entities associated with the first communication.

The controller may be configured to control transmission of the first information entities associated with the first communication from the communication device. The controller may be configured to prevent communication of the first information entities to and/or from the communication device during time intervals that are determined based on said information received from the communication device.

Various other aspects, embodiments and advantages are described in the following detailed description and in the attached claims.

The invention will now be described in further detail, by way of example only, with reference to the following examples and accompanying drawings, in which:

DETAILED DESCRIPTION

In the following certain exemplifying embodiments are explained with reference to wireless or mobile communication systems. Before explaining in detail the certain exemplifying embodiments, certain general principles of a wireless communication system and a mobile communication device are briefly explained with reference to FIGS. 1 and 2 to assist in understanding the embodiments.

Figure 1:
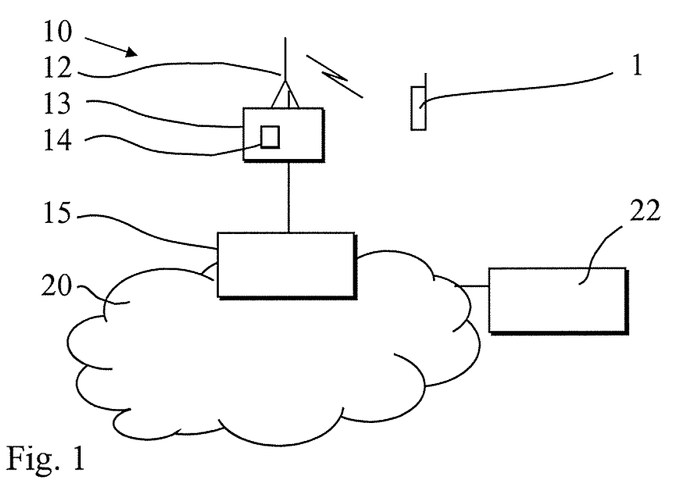
FIG. 1 shows an example of a communication system in which the embodiments of the invention may be implemented.

A communication device can be used for accessing various services and/or applications provided via a communication system. In wireless or mobile systems the access is provided via an access interface between a mobile communication device 1 and an appropriate wireless access system 10. A mobile device 1 can typically access wirelessly a communication system via at least one base station 12 or similar wireless transmitter and/or receiver node. Non-limiting examples of appropriate access nodes are a base station of a cellular system and a base station of a wireless local area network (WLAN). Each mobile device may have one or more radio channels open at the same time and may receive signals from more than one base station.

A base station is typically controlled by at least one appropriate controller entity 13 so as to enable operation thereof and management of mobile devices in communication with the base station. The controller entity is typically provided with memory capacity and at least one data processor. In FIG. 1 the base station node 12 is connected to a data network 20 via an appropriate gateway 15. A gateway function between the access system and another network such as a packet data network may be provided by means of any appropriate gateway node, for example a packet data gateway and/or an access gateway.

Furthermore, FIG. 1 shows a point-to-multipoint service node 22 which is connected to the data network 20. In the example of FIG. 1 communications between the mobile device 1 and the broadcast multicast services node 22 are routed via the data network 20, the gateway 15 and the base station system 12 and 13.

The point-to-multipoint service node 22 may be configured to provide content delivery functions for Multimedia Broadcast/Multicast Service (MBMS) or similar. The service node 22 may be provided by a server which is configured to broadcast or multicast information to multiple participants over a geographical area. The service node 22 may serve as an entry point for transmissions of a content provider providing broadcast or multicast data to communication devices situated in a geographical area served by the service node 22.

Figure 2:
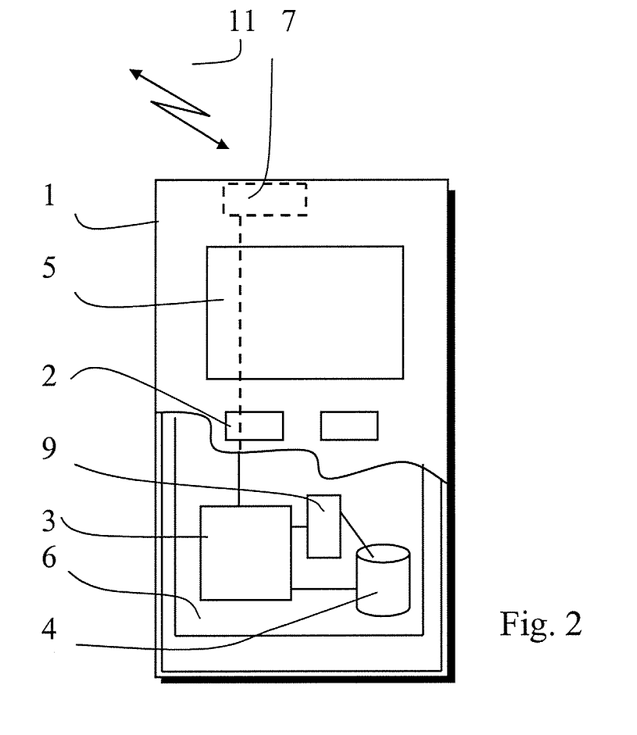
FIG. 2 shows a communication device.

FIG. 2 shows a schematic partially sectioned view of a mobile device 1 that can be used for reception of at least two different carriers and for communication with at least one base station. A mobile device may be used for various purposes. For example, a mobile device may be used for point-to-point i.e. unicast connection such as voice and video calls, for accessing service applications provided in a data network 30 and for receiving and displaying broadcast or multicast content, for example TV programs or videos.

An appropriate mobile communication device may be provided by any device capable of sending and receiving radio signals 11. Non-limiting examples include a mobile station (MS), a portable computer provided with a wireless interface card or other wireless interface facility, personal data assistant (PDA) provided with wireless communication capabilities, or any combinations of these or the like. The mobile device 1 may receive signals via an appropriate radio receiver of the mobile device. In FIG. 2 the radio receiver is designated schematically by block 7. The receiver may be provided for example by means of a radio part and associated antenna arrangement. The antenna arrangement may be arranged internally or externally to the mobile device. The receiver arrangement of the mobile device may be configured for enabling tuning to different carrier frequencies. A mobile device is also typically provided with at least one data processing entity 3, at least one memory 4 and other possible components 9 for use in tasks it is designed to perform. The data processing, storage and other entities can be provided on an appropriate circuit board and/or in chipsets. This feature is denoted by reference 6. The user may control the operation of the mobile device by means of a suitable user interface such as key pad 2, voice commands, touch sensitive screen or pad, combinations thereof or the like. A display 5, a speaker and a microphone are also typically provided. Furthermore, a mobile device may comprise appropriate connectors (either wired or wireless) to other devices and/or for connecting external accessories, for example hands-free equipment, thereto.

An embodiment of the invention will now be described in more detail with reference to the flowchart of FIG. 3 and to two frame structures of FIG. 4. FIG. 4 shows schematically received transmissions 30 including two parallel received frame structures 32 and 34. Frame structure 32 illustrates a dedicated multicast/broadcast carrier that is transmitted on a first frequency. Frames denoted by 33 and 36 of the carrier 32 designate content that a mobile device is expecting to receive. Frame structure 34 illustrates a downlink unicast carrier that is transmitted on a second frequency. As shown in FIG. 4, the broadcast/multicast content is repeating at 33 and 36 in the carrier 32 with a certain interval. The unicast carrier, however, is scheduled on a frame-by-frame basis.

Figure 3:
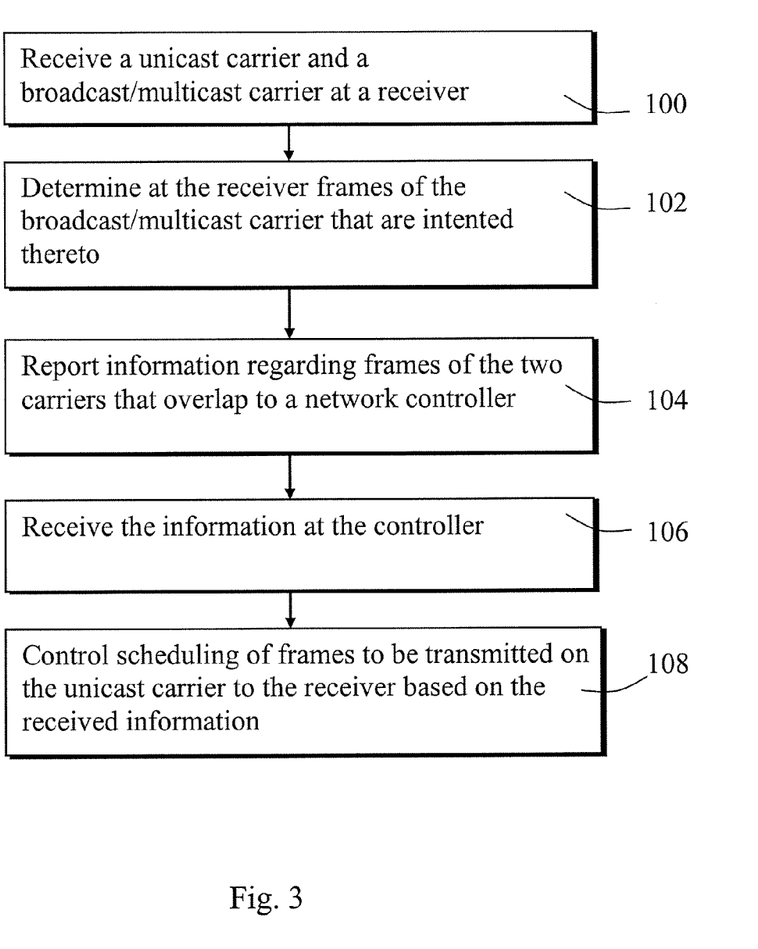
FIG. 3 is a flowchart illustrating an embodiment of the invention.
Figure 4:
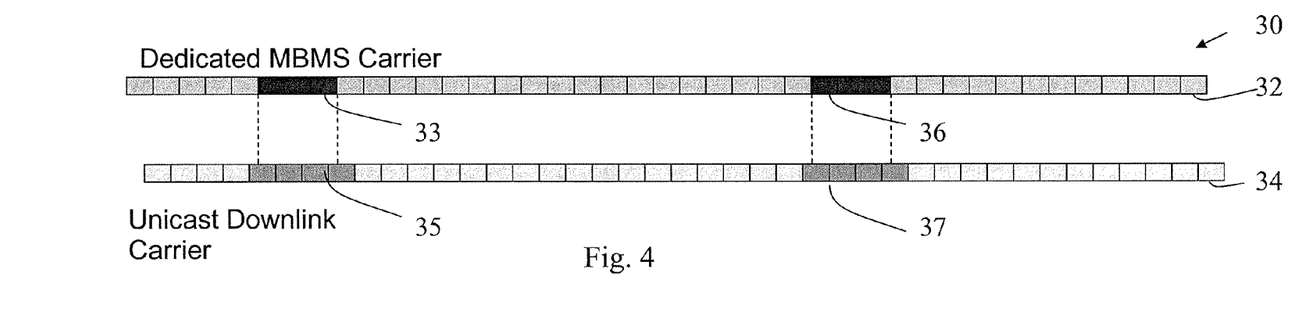
FIG. 4 shows a transmission containing two carriers.

In the exemplifying method of FIG. 3, a mobile device receives at 100 the dedicated multicast or broadcast carrier 32 and the unicast carrier 34 of FIG. 4. The mobile device may then determine at 102 if any of the downlink frames on the dedicated multicast/broadcast carrier 32 contain broadcast or multicast content belonging to the service that the terminal is configured to receive. In FIG. 4 such frames are denoted by 33. When such frames are detected, the mobile device determines the position and identity of the frames on the unicast carrier that overlap the frames of carrier 32. In FIG. 4 these frames are denoted by 35.

In this example the positioning and identity information is determined based on the frames of the unicast carrier 34. This is so because there may be no uplink connection that could directly be associated with the transmitter sending the broadcast/multicast carrier 32. Also, the unicast transmitting base station may not be provided with a transmitter sending the broadcast/multicast carrier 32. Furthermore, a base station sending the broadcast/multicast carrier may not have any use for this information anyway, because it is sending jointly to the whole single frequency network and therefore should not re-schedule its transmissions based on information regarding one communication device only. Therefore information of the unicast frames 35 which are blocked by the frames 33 of the broadcast/multicast transmission 32 is considered more useful.

In accordance with a possibility the physical layer frames 35 of the unicast carrier 34 are identified based on a sequence numbering. For example, a report providing information about the unicast frames 35 overlapping with selected broadcast or multicast content 33 may be used to indicate the starting frame sequence number and the number of subsequent frames of the unicast carrier that overlap broadcast or multicast content or by any other suitable notation. The report may also include information about the repetition period of such frames. This can be provided, for example, by the number of frames to the next occurrence 36 of similar overlapping broadcast or multicast content.

The mobile device may then transmit at 104 a report to the network. The report may contain information of unicast frames that are "blocked" by reception of the parallel broadcast/multicast carrier. In accordance with an embodiment the identified overlapping unicast frames 35 and 37 are reported directly to the base station sending the unicast. The reported information is received and processed at 106 in a network entity that is responsible for scheduling unicast traffic to and from the mobile device. In FIG. 1 arrangement this function can be provided by a processor 13 provided in the access system controller 12. The base station may then use the information to control the unicast transmission to the reporting mobile device so that the unicast frames do not overlap with the broadcast/multicast content the mobile device is receiving.

The network controller may use the information in scheduling transmissions to and/or from the mobile device. For example, the controller entity may block the reported downlink frames from being used for any transmission to the mobile device at 108. Instead, the controller schedules downlink data transmissions for frame positions which are not blocked by the reception of the current point-to-multipoint carrier.

A non-limiting example of mobile architectures whereto the above principles may be applied is known as the Evolved Universal Terrestrial Radio Access (E-UTRA). An exemplifying implementation is therefore now described in the framework of an Evolved Universal Mobile Telecommunication System (UMTS) Terrestrial Radio Access Network (E-UTRAN). An Evolved Universal Terrestrial Radio Access Network (E-UTRAN) consists of E-UTRAN Node Bs (eNBs) which are configured to provide both base station and control functionalities of the radio access network. The eNBs may provide E-UTRA features such as user plane radio link control/medium access control/physical layer protocol (RLC/MAC/PHY) and control plane radio resource control (RRC) protocol terminations towards the mobile devices. It is noted, however, that the E-UTRAN is only given as an example and that the method can be embodied in any access system or combination of access systems where reception of multiple data carriers with shared receiver hardware may be needed for some reason.

The unicast carrier frequency can be discovered by a mobile device for example through a cell search procedure. Similarly, the multicast/broadcast carrier frequency can also be discovered by the mobile device through a cell search procedure. According to an alternative, multicast/broadcast frequency information may be signalled by a network entity to the mobile device on the unicast carrier.

The mobile device may then discover available services on the multicast/broadcast dedicated carrier, for example by analysing "MBMS Session Start" signalling messages or similar messages it receives. These messages can be sent on the multicast/broadcast dedicated carrier, in which case the mobile device can access them during breaks in a unicast transmission. According to an alternative, appropriate information is provided to the mobile device on the unicast carrier.

After the timing of the correct multicast/broadcast session is found from multicast/broadcast control signalling messages, the mobile device can determine which downlink unicast transmission time intervals (TTI) are blocked by the multicast/broadcast signal. In some cellular standards this type of determination is referred to by the term measurement.

A parameter that is commonly understood by the mobile device and a relevant network entity can be used for identifying the relevant time interval and/or frames. Examples of these include the unicast transmission time interval and (sub) frame numbering. Such a number is available in typical communication systems as a part of unicast system information broadcast for a variety of reasons. For example, the UTRAN provides a cell-specific "System Frame Number" and a mobile device-specific "Connection Frame Number" that may be used in the reporting. It is noted that the specific details of the frame numbering and timing scheme as such are not relevant in understanding the concept of this disclosure. Instead, any mechanism that may be used to provide a common timing reference between the mobile device and the network regarding the unicast carrier may be employed in here.

Once the information required for a report is available, the information may be included for example in a Radio Resource Control (RRC) Measurement Report and sent to the network. Based on the report an entity scheduling data transmissions to and from the mobile device can then take any necessary action. Those unicast downlink transmission time intervals (TTI) which were reported by the mobile device as being covered by the multicast/broadcast reception are blocked from the scheduling opportunities to said mobile device. After this the scheduler may only consider sending data to said mobile device in those transmission time Intervals which are not blocked by the multicast/broadcast reception.

The report generated by the mobile device may contain various information that can be used by the network entity for determining the frame position that need to be reserved for multicast/broadcast reception. For example, an information parameter indicative of a starting subframe number, the number of consecutive blocked subframes and repetition period such as the number of unicast subframes until next multicast/broadcast transmission may be included. Instead of a "subframe" also "transmission time interval" (TTI), which describes the smallest scheduling block of the physical layer, can be reported. This requires that it is known by both the mobile device and the base station, for example an E-UTRAN eNB.

Figure 5:
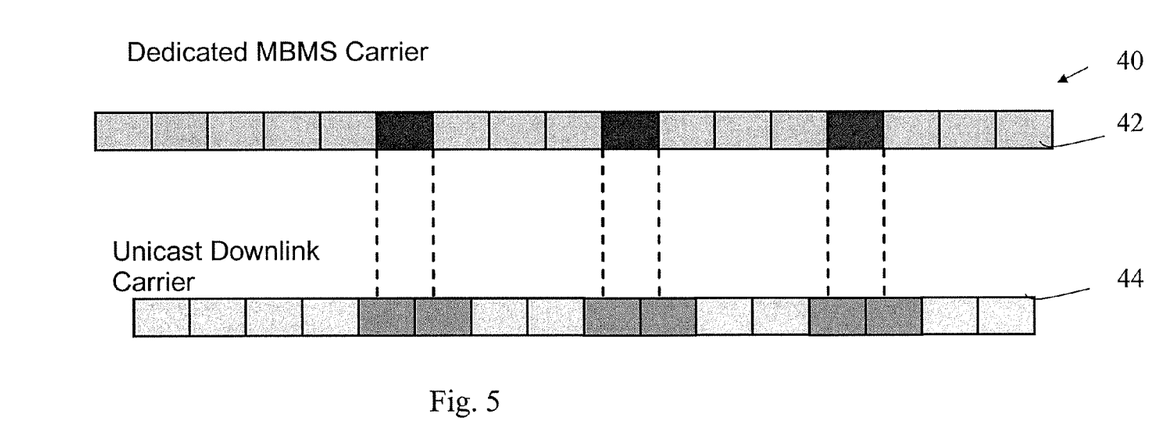
FIG. 5 shows another transmission containing two carriers.

Other information parameters may also be included. For example, the multicast/broadcast transmission may occur in a multiple of data bursts which are repeated with regular intervals. This scheme is illustrated by FIG. 5 showing a multiplexed transmission signal 40 containing a multicast/broadcast carrier 42 and unicast carrier 44. In such case the determinations may also be recorded as a data burst specific measurements with suitable reference for burst numbering. For example, burst 1 start—length—periodicity, burst 2 start—length—periodicity and so on. This scheme may be desired in some applications to increase flexibility.

To illustrate a possible use of this scheme, the following exemplifying scenario is considered. Assume that an operator or another service provider wishes to send 16 TV channels on a dedicated multicast/broadcast carrier. These 16 channels should be time-multiplexed to optimize mobile device power consumption. Assuming the required maximum delay for changing from a TV channel to another is one second, data for every channel would optimally be sent once per second with burst duration of 1/16 s=62.5 ms at a time. However, if the mobile device is required to support simultaneous voice calls, current cellular speech codecs typically produce speech frames with a periodicity of 20 ms. Therefore the active multicast/broadcast burst of 62.5 ms is too long and would effectively delay the transmission of several speech frames on the unicast carrier. So, the TV burst needs to be somehow shortened. If a uniform burst size and repetition period are maintained, 1/53 s<19 ms may be required in order to have space for both the multicast/broadcast data burst and the unicast speech transmission time interval (1 ms) within the 20 ms. This would not result in optimized use of power compared to for example Digital Video Broadcasting for Handheld (DVB-H), where the burst interval, and consequently mobile device receiver sleep time, is several seconds.

To address this issue multiple shorter bursts may be employed, as shown in FIG. 5. Using the framework of the example explained above one can have for example four multicast/broadcast bursts of the length of 16 ms each with 4 ms gaps between the consecutive bursts to leave sufficient space for the speech frames to be sent on the unicast carrier in the required 20 ms interval. If the gaps between the consecutive bursts produce considerable overhead, two or three TV channels can be interleaved in time, for example as follows:

Chn 1 Burst 1-Chn 2 Burst 1-Chn 3 Burst 1-Chn 1 Burst 2-Chn 2 Burst 2-Chn 3 Burst 2-Chn 1 Burst 3 and so on.

If required, prevention of transmission of frames in certain positions can also be applied to uplink transmission of frames. This may be advantageous for example in cellular mobile devices operating continuously in frequency division duplexed (FDD) mode. Such mobile device may be provided with separate transmitters and receivers. This is the case with e.g. Wideband Code Division Multiple Access (WCDMA) mobile devices, which support simultaneous uplink and downlink. Assuming that the mobile devices support simultaneous uplink and downlink, if the uplink unicast carrier is too close in frequency to the dedicated multicast/broadcast carrier, a filtering problem may occur. To address this uplink transmission during multicast/broadcast reception may also be blocked. This may be provided, for example, by not scheduling any uplink transmission for the blocked frames by the network scheduling entity. Due to the absence of any uplink frames during multicast/broadcast reception the filtering problem between unicast uplink and dedicated multicast/broadcast carrier would not appear.

A new report may need to be generated in response to detection that the positioning of information entities associated with the broadcast/multicast communication has changed relative to the positions of the information entities associated with the unicast communication. In response to the detection the communication device knows that the unicast frames that are blocked are different than what was earlier reported.

The need to report a change may be caused by a cell change. This is so because the unicast carrier timing can be cell-specific, and therefore the timing may only be valid in a cell where it was measured. New measurement reports may also be needed when the dedicated multicast/broadcast carrier timing and unicast downlink carrier timing slides so much that the blocked transmission time intervals are different. New report may also be required when the mobile device changes the multicast/broadcast session. For example, a user may change the TV channel causing the multicast/broadcast transmission to occur over different unicast transmission time intervals The required data processing functions may be provided by means of one or more data processors provided in the communication device or elsewhere. An appropriately adapted computer program code product or products may be used for implementing the embodiments, when loaded on an appropriate processor. The program code means may, for example, perform at least one of the tasks of detection of the overlapping frames and controlling generation and sending of an appropriate report to a network entity. The program code product may be stored on and provided by means of a carrier medium such as a carrier disc, card or tape. A possibility is to download the program code product to the communication device via a data network.

The above embodiments may provide a feasible solution for supplying of one-to-many services on a separate carrier frequency from the frequency of point-to-point services. The embodiments may also provide advantage in enabling better utilization of multicast/broadcast and unicast capacity in a device provided with a shared receiver. The operation is mobile device specific and as different mobile devices may be tuned for example to different TV channels, both the dedicated multicast/broadcast carrier and the unicast carrier can be scheduled full of data. The mobile device hardware cost compared to service quality may be reduced as only one receiver may be required, but the user can still simultaneously receive various data transmissions, for example watch TV and have an active voice call. Mobile device power may also be saved as only one receiver may be required. Also advanced receivers (diversity receivers, for example multiple input multiple output (MIMO)) can be implemented only once and used for both unicast and broadcast. Also, an expanded frequency band may be provided for dedicated multicasting/broadcasting. If the measurements are applied to uplink scheduling as described above, also frequency bands close to cellular unicast uplink may become usable for the dedicated multicast/broadcast carrier.

It is noted that whilst embodiments have been described in relation to communication devices such as mobile devices, embodiments of the present invention are applicable to any communication apparatus wherein prevention of transmission of frames in certain positions may be desired.

It is also noted that although certain embodiments were described above by way of example with reference to the exemplifying architectures of a certain communication system, embodiments may be applied to any other suitable forms of communication systems than those illustrated and described herein.

It is also noted herein that while the above describes exemplifying embodiments of the invention, there are several variations and modifications which may be made to the disclosed solution without departing from the scope of the present invention as defined in the appended claims.

The invention claimed is:

1. A user device comprising:
   at least one receiver configured to receive at the user device, via a first carrier, unicast data segments, and configured to receive at the user device, via a second carrier, broadcast or multicast data segments;
   at least one processor configured to determine at least one of which ones of the broadcast or multicast data segments overlap with the unicast data segments and unicast transmission time intervals that are blocked by multicast/broadcast transmission;
   the at least one processor further configured to generate, at the user device, information regarding at least one of positions that are to be reserved for broadcast or multicast data segments and unicast transmission time intervals that are blocked by multicast/broadcast transmission; and
   a transmitter configured to determine to send, from the user device, a base station controller report, wherein the base station controller report conveys said generated information,
   wherein said data segments are one of frames and bursts.

2. A user device as claimed in claim 1, wherein the at least one receiver is configured to receive the unicast data segments and the broadcast or multicast data segments on different carrier frequencies.

3. A user device as claimed in claim 2, wherein the at least one processor is configured to perform a cell search procedure to discover the carrier frequency of at least one of the unicast data segments and the broadcast or multicast data segments.

4. A user device as claimed in claim 1, wherein the report contains information regarding at least one of an identification of a first blocked data segment, a number of consecutive blocked data segments, and a repetition period of blocked data segments.

5. A user device as claimed in claim 1, wherein the at least one processor is configured to generate a report in response to a detection that positioning of the broadcast or multicast data segments has changed relative to positions of the unicast data segments.

6. A user device as claimed in claim 1, wherein the at least one receiver is configured to receive the unicast data segments from an asynchronous system and the broadcast or multicast data segments from a synchronous system.

7. A user device as claimed in claim 1, comprising a mobile communication device.

8. A user device as claimed in claim 7, wherein the at least one processor is configured to determine to include the information in a radio resource control (RRC) protocol message.

9. A user device as claimed in claim 7, comprising a mobile communication device configured to receive signals at least from one of a Universal Mobile Telecommunication System Terrestrial Radio Access Network (UTRAN) and an Evolved Universal Mobile Telecommunication System Terrestrial Radio Access Network (E-UTRAN).

10. A user device as claimed in claim 7, wherein the at least one receiver is configured to receive a point-to-point carrier in accordance with a cellular standard and a point-to-multipoint carrier in accordance with a standard for digital video broadcasting for handheld devices.

11. A base station controller, comprising:
an interface configured to receive, at the base station controller, a user apparatus transmission of a report, wherein the user apparatus transmission of the report conveys information regarding at least one of positions that are to be reserved for broadcast or multicast data segments and positions that are blocked for unicast data segments;
at least one processor configured to at the base station controller based on the user apparatus transmission of the report, reserve the positions that are to be reserved for broadcast or multicast data segments; and
the at least one processor further configured to determine to prevent, during time intervals corresponding to the positions that are blocked for unicast data segments reported by said report, communication of unicast data segments,
wherein said data segments are one of frames and bursts.

12. A base station controller as claimed in claim 11, wherein the at least one processor is configured to control transmission, from a base station to a communication device, of unicast data segments.

13. A base station controller as claimed in claim 11, wherein the at least one processor is configured to control transmission, from a communication device, of unicast data segments.

14. A base station controller as claimed in claim 11, wherein said data segments are bursts, and wherein each of bursts for carrying broadcast or multicast data segments contain at least a first set of information and a second set of information.

15. A base station system comprising a base station controller as claimed in claim 11.

16. A base station system as claimed in claim 1, comprising one of a Universal Mobile Telecommunication System Terrestrial Radio Access Network (UTRAN) and an Evolved Universal Mobile Telecommunication System Terrestrial Radio Access Network (E-UTRAN).

17. A base station communication system comprising:
a transmitter configured to transmit unicast data segments;
at least one transmitter configured to transmit broadcast or multicast data segments;
a receiver configured to receive user apparatus communications; and
at least one controller configured to receive, at the base station communication system, a user apparatus transmission of a report, wherein the user apparatus transmission of the report conveys information regarding at least one of positions that are to be reserved for broadcast or multicast data segments and time intervals corresponding to positions that are blocked for unicast data segments, and configured to, at the base station communication system based on the user apparatus transmission of the report, reserve the positions that are to be reserved for broadcast or multicast data segments and determine to prevent, during time intervals corresponding to the positions that are blocked for unicast data segments reported by said report, communication of unicast data segments,
wherein said data segments are one of frames and bursts.

18. A base station communication system as claimed in claim 17, wherein first carrier unicast communication comprises point-to-point communications and second carrier broadcast or multicast communication comprises point-to-multipoint communications.

19. A method, comprising:
receiving at a user device, via a first carrier, unicast data segments, and receiving at the user device, via a second carrier, broadcast or multicast data segments;
determining at least one of which ones of the broadcast or multicast data segments overlap with the unicast data segments and unicast transmission time intervals that are blocked by multicast/broadcast transmission;
generating, at the user device, information regarding at least one of positions that are to be reserved for broadcast or multicast data segments and unicast transmission time intervals that are blocked by multicast/broadcast transmission; and
determining to send, from the user device, a base station controller report, wherein the base station controller report conveys said generated information,
wherein said data segments are one of frames and bursts.

20. A method as claimed in claim 19, wherein the generating comprises generating information regarding positions of first frames associated with point-to-point communications that coincide with position of second frames associated with point-to-multipoint communications.

21. A method as claimed in claim 19, comprising transmitting the unicast data segments asynchronously from a base station and transmitting the broadcast or multicast data segments synchronously from a plurality of base stations.

22. A method as claimed in claim 19, comprising determining to prevent transmissions to and/or from the user device within said reserved positions.

23. A method as claimed in claim 19, wherein the report contains information regarding at least one of an identification of a first blocked data segment, a number of consecutive blocked data segments, and a repetition period of blocked data segments.

24. A method as claimed in claim 19, comprising determining to reserve, based on said report, at least one time slot for transmission of frames or bursts associated with broadcast or multicast.

25. A method as claimed in claim 19, wherein the generating said information is performed at a mobile communication device.

26. A method as claimed in claim 25, comprising:
generating a report in response to a detection that positioning of the broadcast or multicast data segments has changed relative to positions of the unicast data segments.

27. A computer program product comprising computer executable program code recorded on a non-transitory computer readable storage medium, the computer executable program code comprising code for causing performance of the method of claim 19.

* * * * *